United States Patent [19]
Watanabe et al.

[11] Patent Number: 5,445,185
[45] Date of Patent: Aug. 29, 1995

[54] PIEZOELECTRIC FLUID CONTROL VALVE

[75] Inventors: Shunso F. Watanabe, Livonia; Steven J. Eckert, Royal Oak; Gerald H. Engelman, Dearborn, all of Mich.; Neil T. Dionesotes, Acton, Mass.; Steven R. Collins, Lexington, Mass.; Steven D. Bernstein, Brookline, Mass.

[73] Assignee: Ford Motor Company, Dearborn, Mich.

[21] Appl. No.: 163,212

[22] Filed: Dec. 6, 1993

Related U.S. Application Data

[63] Continuation-in-part of Ser. No. 43,127, Apr. 5, 1993, Pat. No. 5,267,589.

[51] Int. Cl.$^6$ ............................................. F16K 11/14
[52] U.S. Cl. ............................ 137/596.17; 137/625.28; 137/870; 251/129.06; 251/129.07
[58] Field of Search ............... 137/596.17, 625.28, 137/870; 251/129.06, 129.07

[56] References Cited

U.S. PATENT DOCUMENTS

| | | | |
|---|---|---|---|
| 4,690,465 | 9/1987 | Takeda et al. | 303/119 |
| 4,740,041 | 4/1988 | Pannbacker | 303/119 |
| 4,768,751 | 9/1988 | Giachino et al. | 251/331 |
| 4,854,424 | 8/1989 | Yamatoh et al. | 188/72.1 |
| 4,965,729 | 10/1990 | Hafner | 364/426.03 |
| 4,966,037 | 10/1990 | Sunmer et al. | 73/204.26 |
| 5,000,521 | 3/1991 | Majima et al. | 303/92 |
| 5,029,805 | 7/1991 | Albarda et al. | 251/11 |
| 5,067,778 | 11/1991 | Testardi | 303/113 R |
| 5,161,774 | 11/1992 | Engelsdorf et al. | 251/11 |
| 5,309,943 | 5/1994 | Stevenson et al. | 137/625.5 |

FOREIGN PATENT DOCUMENTS

| | | |
|---|---|---|
| 60-081527 | 5/1985 | Japan . |
| 60-139563 | 7/1985 | Japan . |
| 844742 | 8/1960 | United Kingdom ........... 251/129.06 |

OTHER PUBLICATIONS

"Micromachined Silicon Microvalve", by S. D. Bernstein et al., IEEE, CH2832-4, 1990, pp. 95–98.
"Electrically Activated, Normally-Closed Diaphragm Valves", by Hal Jerman, IEEE, 91CH2817-5, 1991, pp. 1045–1048.

*Primary Examiner*—Gerald A. Michalsky
*Attorney, Agent, or Firm*—Roger L. May; Richard D. Dixon

[57] ABSTRACT

A piezoelectric fluid control valve (10) and fluid control method using a polymorph (48) with a characteristic that as a potential difference is applied thereto, the polymorph is deflected. The valve includes a supply port (14) for introducing fluid and a chamber (16) defined within the valve body. An outlet port (18) is in fluid communication with the chamber and a device controlled thereby, such as an anti-lock brake system. A relief port (78) returns fluid to a source thereof. Upper and lower metering elements (100, 116) are supported within the chamber. A cantilevered spring valve (128, 130) is positionable within metering orifices defined within the metering elements (100, 110). The polymorph is positioned between and in operative communication therewith. An electrical circuit (56) is connected to the polymorph, the circuit providing the potential difference thereto, which is regulated in accordance with an input signal delivered to the circuit. An input signal generator (58) operates in response to a sensed condition such as brake pressure and wheel deceleration, the fluid flow in the outlet port being continuously modulated in response to the sensed condition.

20 Claims, 5 Drawing Sheets

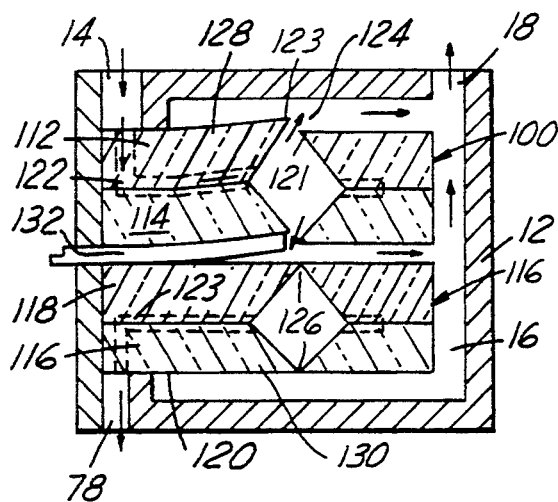
fig=5
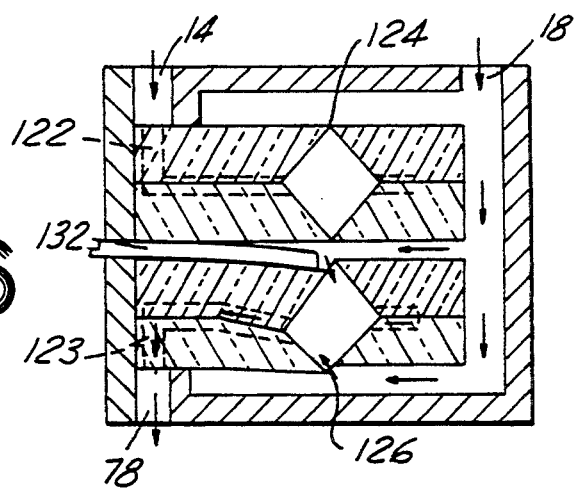
fig=6
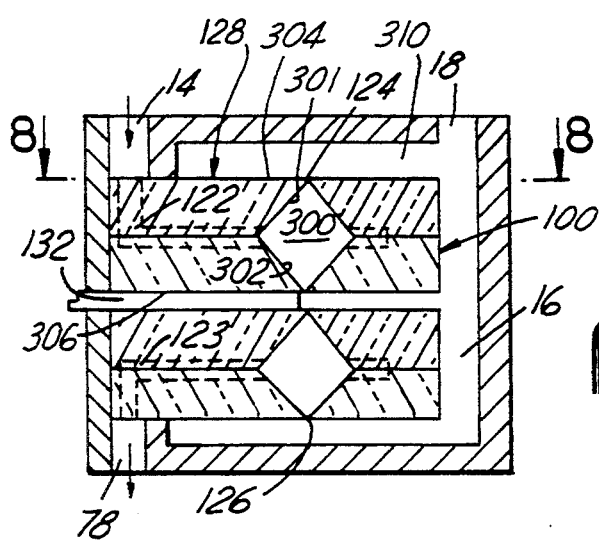
fig=7
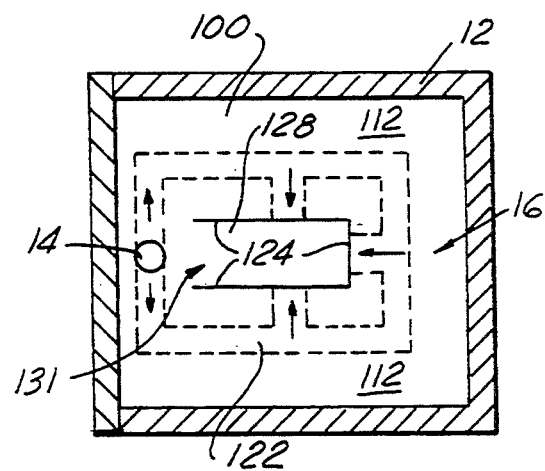
fig=8

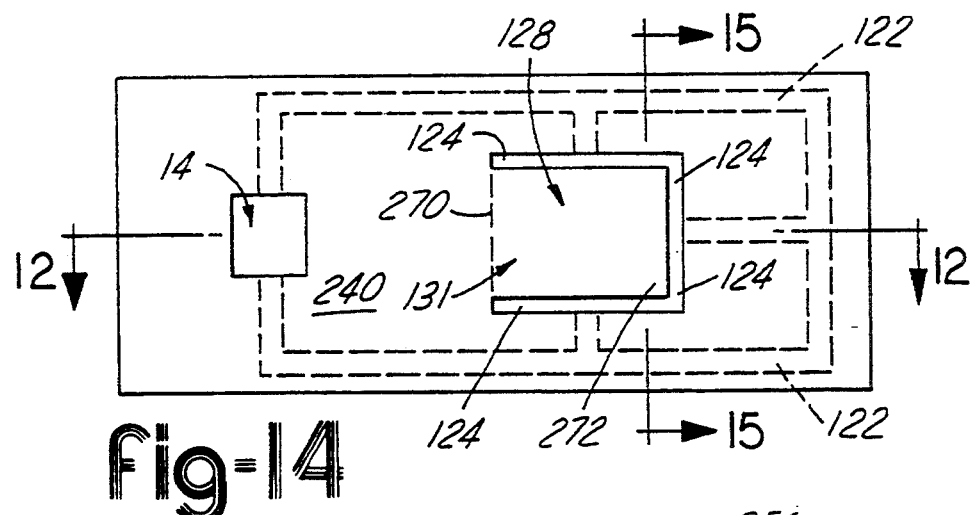
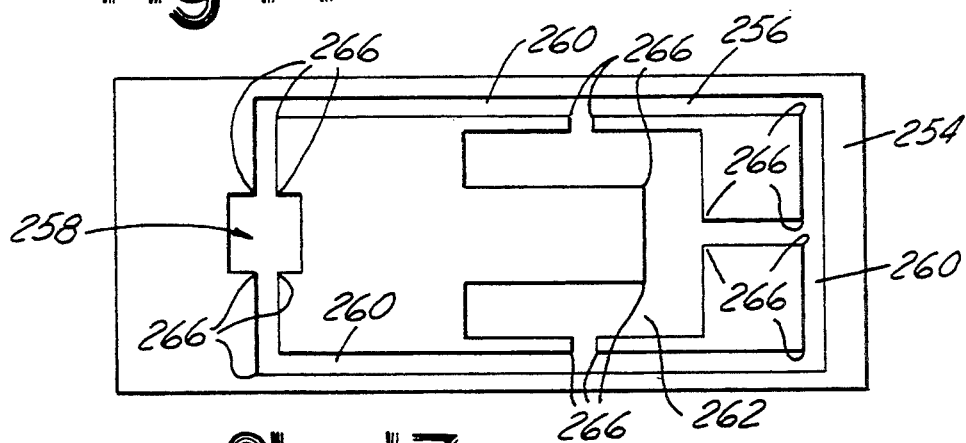
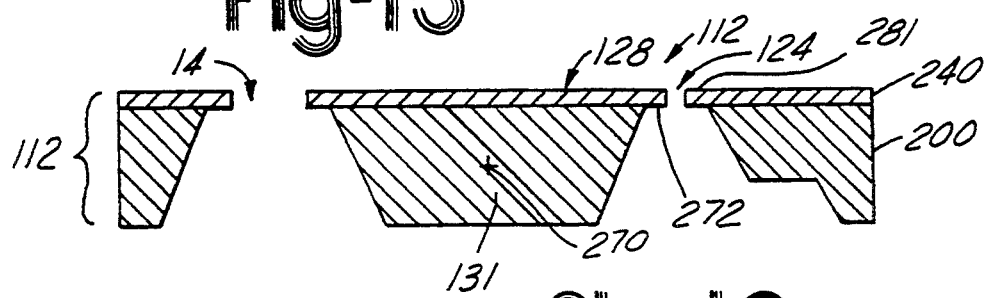
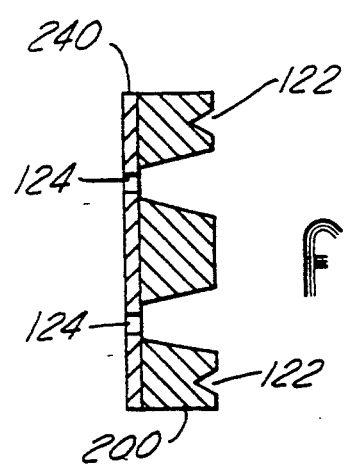

PIEZOELECTRIC FLUID CONTROL VALVE

REFERENCE TO APPLICATION

This is a continuation-in-part of application Ser. No. 08/043,127, filed Apr. 5, 1993, now U.S. Pat. No. 5,267,589.

BACKGROUND OF THE INVENTION

1. Field Of The Invention

The present invention is concerned with piezoelectric fluid control valves. More specifically, the invention relates to a valve used in conjunction with a system, such as an anti-lock braking system, which requires high frequency actuation capabilities.

2. Background Art

The piezoelectric effect was discovered by Jacques and Pierre Curie in 1880. They found that certain materials deform when exposed to an electrical field. This has become known as the inverse piezoelectric effect. The effect is practically linear, i.e., the deformation varies directly with the applied potential difference. It is also direction-dependent, so that if the material is exposed to an electric field, it will experience an elastic strain which causes its length to increase or decrease according to the polarity of the field. This behavior is manifest in such materials as piezoelectric ceramics, which are hard, chemically inert, and completely insensitive to humidity and other atmospheric influences.

As an example of harnessing piezoelectric phenomena, U.S. Pat. No. 4,690,465, which issued on Sep. 1, 1987, discloses an anti-skid hydraulic pressure modulator for a vehicular hydraulic braking system. The system includes a piezoelectrically operated pressure modulator, including a passage which is opened and closed by a piezoelectric actuator. The piezoelectric element expands and contracts almost instantaneously in response to voltage application and voltage drop. However, in such systems, responsiveness is limited in operation by a shut-off valve being positioned either in an "on" or "off" position. Such systems do not exhibit a continuously controlled modulation.

In the past, the effectiveness of devices which may be controlled by a pressure control valve has been limited by the inherent sluggishness or delay with which fluid flow, for example, changes in response to a sensed condition (such as applied brake pressure).

In an article entitled "*Electrically Activated, Normally-Closed Diaphragm Valves*" by H. Jerman (91CH2817-5/91 IEEE), the author observes that conventional valves for flow control have typically used magnetic actuation in the form of solenoids or motors to drive spool valves. The reference notes that valve actuation is possible using piezoelectric drivers, but the properties of such materials produce high forces with a very small deflection for button-type actuators. The reference states that such a driver has been reported as a valve actuator, but the complicated assembly and high voltage operation is said to be unattractive for many commercial applications.

U.S. Pat. No. 4,768,751 which issued on Sep. 6, 1988 discloses a silicon micromachined non-elastic flow valve. That reference discloses a valve assembly for controlling fluid flow, including an actuator and a fluid. The actuator separates the nozzle plate from a valve plate, thereby permitting fluid flow. Also disclosed is a spring means for biasing the nozzle plate into a closed position to arrest fluid flow.

Against this background, there remains an unsatisfied need for low cost fluid control valves which can be made in large quantities and which exhibit a higher frequency response than those presently known, wherein there is a continuous modulation of flow output in response to an input signal which is communicated to the valve.

SUMMARY OF THE INVENTION

The present invention is a piezoelectric fluid control valve for delivering a fluid, such as hydraulic fluid, to a device such as an anti-lock braking system, which is operable in response to fluid emerging from the valve.

Included in the valve is a polymorph which includes one or more piezoelectric plates or ceramic wafers. The polymorph has the characteristic that as a potential difference is applied, it becomes deflected.

The piezoelectric fluid control valve of the present invention comprises a valve body with a supply port for introducing fluid into the valve, a chamber defined therewithin, and an outlet port which is capable of delivering fluid to the device controlled thereby.

An upper metering element is supported within the chamber. The upper metering element lies adjacent to the polymorph. Located on an opposing face of the polymorph is a lower metering element.

Each metering element has an anchored end affixed to a wall of the chamber. An inlet channel is defined in communication with the supply port within the anchored end of the upper metering element. An outlet channel in communication with the return port is defined within the lower metering element.

Each metering element has a rectangular metering orifice which cooperates with a cantilevered spring valve that is positionable therewithin. The cantilevered spring valves are continuously displaceable between an opened position and a normally closed position.

The polymorph, positioned between and in operative communication with the upper or lower metering elements, has the characteristic that as potential difference is applied, it becomes deflected, thereby displacing the upper or lower cantilevered spring valve in response to an electrical signal provided thereto. The electrical signal is generated in response to a sensed condition, such a brake pressure and/or wheel deceleration. As a result, fluid in the outlet port is continuously modulated in response to the sensed condition.

It is an object of the present invention to provide a fluid control valve which exhibits a higher frequency response than presently known.

It is also an object of the present invention to provide continuous modulation of fluid flow or pressure in a linear relation with the input signal communicated to the valve.

Further, it is also an object of the present invention to provide a low cost, fluid control valve having fewer moving parts which can be made in large quantities.

BRIEF DESCRIPTION OF THE DRAWINGS

FIG. 5 is a cross sectional view of a valve in accordance with a third embodiment, illustrating the valve in its opened position wherein fluid is delivered to a device controlled thereby;

FIG. 6 is a cross sectional view of the third embodiment of FIG. 5, illustrating the valve in a dump position;

FIG. 7 is a cross sectional view of the third embodiment of FIG. 5, illustrating the valve in a closed position.;

FIG. 8 is a top view of the valve depicted in FIGS. 5-7;

FIGS. 10-16 are diagrammatical sketches used to illustrate the fabrication of a valve plate used in the valve of FIG. 5, FIGS. 10, 12, 15, and 16 being cross-sectional views at various stages of such fabrication, FIG. 11 being a plan view of FIG. 10, FIG. 13 being a plan view of a mask used in forming the structure shown in FIGS. 12, 14, 15, and 16, and FIG. 14 being a plan view of FIG. 12.

BEST MODES(S) FOR CARRYING OUT THE INVENTION

Figure 1:
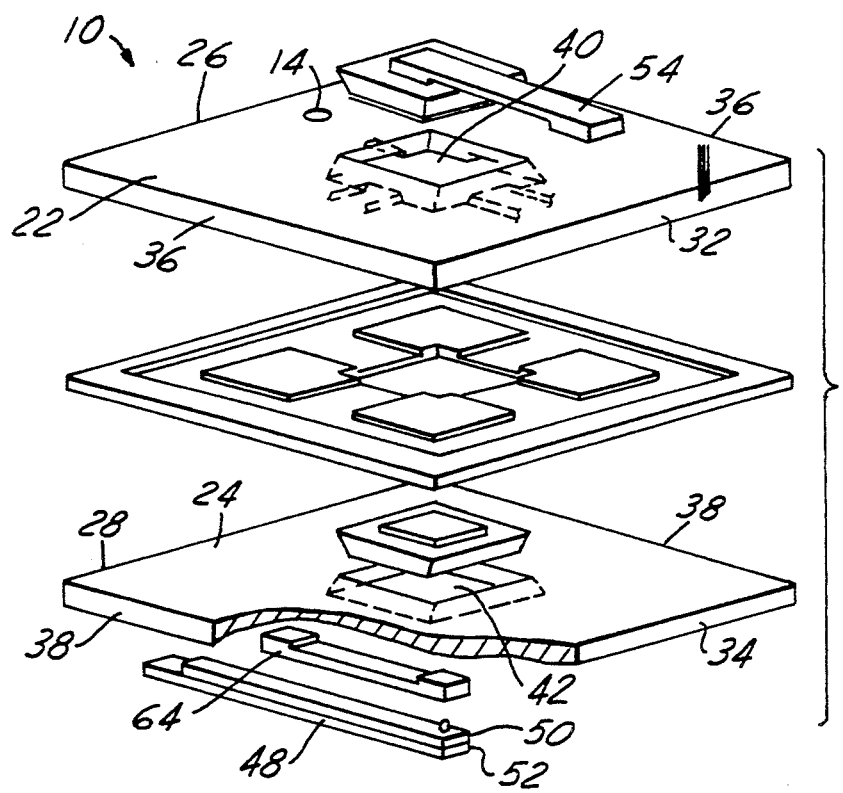
FIG. 1 is an exploded perspective view of an embodiment of a piezoelectric fluid control valve according to the present invention.
Figure 2:
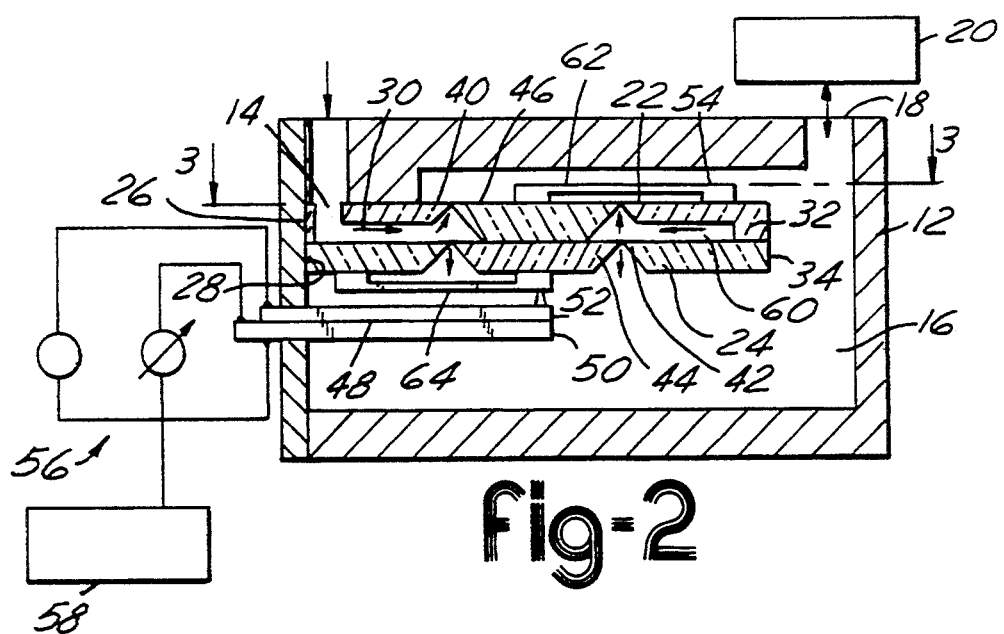
FIG. 2 is a cross-sectional view of another valve embodiment, illustrating the valve in its closed position.

The present invention discloses a piezoelectric fluid control valve 10, an earlier embodiment of which is depicted in FIGS. 1 and 2. The valve includes a valve body 12 with a supply port 14 for introducing hydraulic fluid into the valve at a supply pressure ($P_s$). In communication with the supply port is a chamber 16 and an outlet port 18 which delivers the hydraulic fluid at a control pressure ($P_c$) to a device which is operable in response to the control pressure. Such a device includes but is not limited to an anti-lock braking/traction control system, a vehicular transmission system, an engine intake/outlet valve, and a suspension system. Patent application Ser. No. 07/765,613, now U.S. Pat. No. 5,217,283, entitled "*Integral Anti-Lock Brake/Traction Control System*" was filed on Sep. 25, 1991 and is incorporated herein by reference. In general, it is contemplated that any application having a multi-stage valve can usefully be enhanced by the valve of the present invention as its first stage.

Supported within the chamber 16 is a top valve plate 22 and a bottom valve plate 24. Each valve plate 22,24 has an anchored end 26,28 affixed to a wall of the chamber (not shown in FIG. 1 for simplicity) adjacent to the supply port 14. To permit fluid flow, the anchored end 26 of the top valve plate 22 is provided with an inlet channel 30 (FIGS. 2-3) which is in communication with the supply port.

A metering orifice 40,42 is disposed within each valve plate 22,24.-Seatable within each metering orifice is a double popper valve head 44 which is continuously displaceable between an open position and a normally closed position. The valve head has sharp metering edges 46 that cooperate with the associated metering orifice so that the edges block fluid flow when the valve head is seated.

Located within the chamber 16 is a polymorph, one embodiment of which is a bimorph 48 that preferably includes two piezoelectric ceramic wafers 50,52 bonded together. Piezoelectric ceramics are known and have been marketed under such trade names as PXE (PIEZOXIDE) by N. V. Philips' Gloeilampenfabrieken, located in The Netherlands. Such materials generally are compounds of lead zirconate and lead titanate. Piezoelectric crystals are polycrystalline ferrolectric materials with the perovskite crystal structure—a tetragonal/rhombahedral structure very close to cubic. Piezoelectric properties are exhibited by a number of naturally occurring crystals, such as quartz, tourmaline, and sodium potassium tartrate.

When two piezoelectric ceramic strips or wafers, polarized in their thickness direction are bonded together, they form the bimorph 48. If they are polarized in opposite directions, they become known as a series bimorph. If polarized in the same direction, they are known as a parallel bimorph.

As depicted in FIGS. 1-2, a piezoelectric ceramic beam, preferably comprising wafers 50,52 is selected so that the wafers have piezoelectric characteristics which are different. As a potential difference is applied across the wafers, one expands and the other contracts, thereby bending the bimorph. Deflection is virtually instantaneous and proportional to the potential difference.

Figure 3:
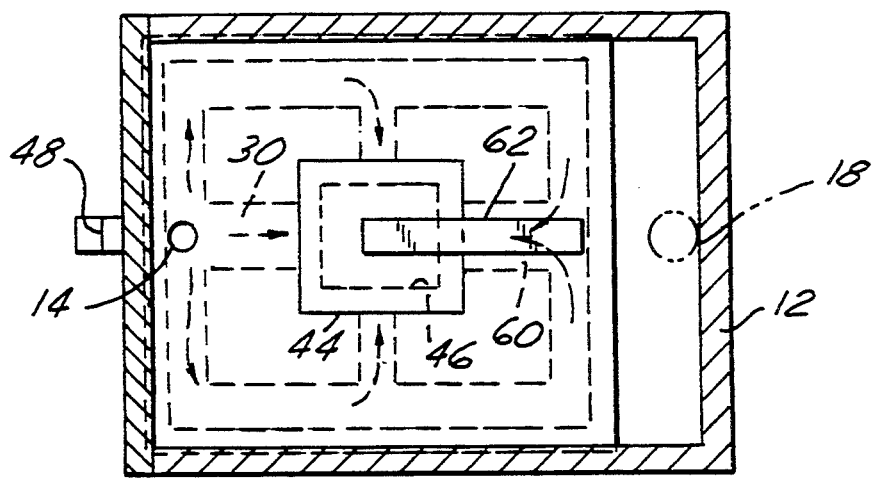
FIG. 3 is a cross-sectional view of the valve depicted in FIG. 2, taken along the line 3—3 thereof.

Turning now to FIGS. 2-3, the anchored end 26 of plate 22 is provided with an inlet channel 30 in communication with the supply port.

In an earlier embodiment of the invention, a double popper valve head 44 is seatable within metering orifices 40,42 provided within the valve plates 22,24. The valve head 44 is continuously displaceable between an opened position when the bimorph 48 bends and a normally closed position. The double poppet valve head 44 has sharp metering edges 46 that cooperate with the metering orifices 40,42, the edges blocking fluid flow when the poppet valve head is seated.

To revert the poppet valve head to its normally closed position, means for biasing 54, such as a pair of springs, are affixed to the valve plates 22,24 and the double poppet valve head. The biasing means also serve to register the poppet valve head within the associated metering orifice.

A voltage is applied to the bimorph 48, preferably by an electrical analog charge-drive circuit 56 connected to the bimorph. The voltage is applied in such a way that one wafer contracts while the other expands. Since the wafers are joined together, they bow.

Preferably, in a parallel bimorph configuration, both wafers are polarized in the same direction and are connected in parallel. This offers higher sensitivity and the possibility of applying a bias voltage to generate an electric field parallel to the direction of polarization, thus eliminating the risk of depolarization. Deflection in this configuration is high, and blocking forces are relatively low.

The analog charge-drive circuit 56 applies a potential difference to the bimorph, which is regulated in accordance with an input signal delivered to the circuit. The input signal is provided by an input signal generating means 58, such as a microprocessor in response to a parameter characteristic of a sensed condition. For simplicity, details of the microprocessor are omitted, as they fall within the purview of those skilled in the art. As an example, the microprocessor may generate the input signal in response to a parameter such as wheel rotational speed sensed in a moving car.

As an example, a plus 10 volts would open an hydraulic flow path from the supply pressure, increasing the control pressure on something such as a mechanical brake in a vehicle. As the pressure increases, the force that the brake is applying on the vehicle will increase. A minus 10 volts would then allow the hydraulic fluid to flow from the brake, reducing the amount of pressure or force that the brake is generating.

The analog charge-drive circuit exploits the fast response of high power actuators. The circuit delivers high currents at high voltage levels during short periods. Essentially, the bimorph is a capacitive device. Accordingly, power levels can be considerable if the actuator is switched at a high repetition rate.

Figure 9:
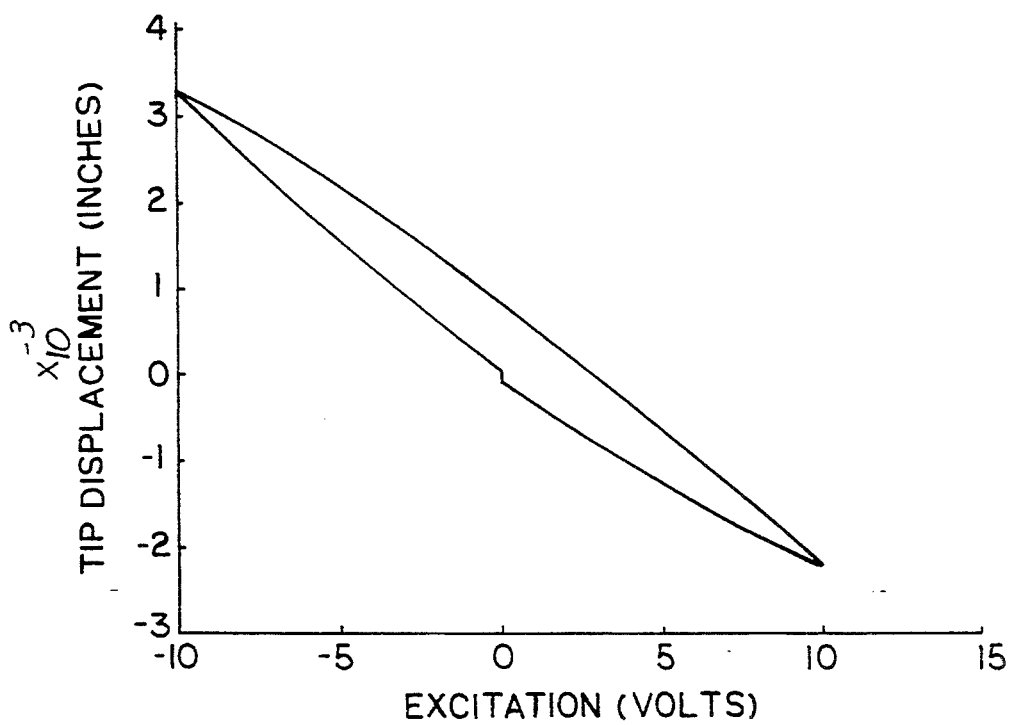
FIG. 9 is a graph illustrating the deflection of a piezoelectric polymorph used in the present invention with voltage applied thereto.

Preferably, the bimorph is driven by a charge drive circuit in which there is a substantially linear relation between tip displacement and excitation voltage (FIG. 9). That figure is an example of the deflection of a piezoelectric actuator as a function of the applied voltage. The curves of FIG. 9 have been measured on a bimorph high power actuator which is assembled from $9 \times 18 \times 1.0$ mm rectangular plates.

Preferably, the analog charge drive circuit of the present invention generates a current to the bimorph which causes a voltage drop across a resistor (not shown). This is used as a feedback signal for an operational amplifier. The current to the bimorph, and thus the charge, is regulated according to the input voltage. This charge-drive circuit produces a linear response between the input and output voltages.

It should be appreciated that though a polymorph has been disclosed herein, a configuration known as a monomorph may also be applicable. In a monomorph, a ceramic element is bonded to a metal disk such that the configuration is planar in the absence of any potential difference applied across the ceramic element and metal disk. When a voltage is applied opposite to poling, the piezoelectric ceramic expands. If the voltage is applied in the direction of poling, the piezoelectric ceramic shrinks.

Turning now to FIG. 2, the top valve plate 22 is provided with a free end 32 that defines an inlet channel 30 which is in communication with the supply port. The associated fluid flows are depicted in FIGS. 2-3. The hydraulic fluid enters the valve body 12 at the supply port 14, whence it enters fluid inlet channel 30 toward the metering edges 46, which cooperate with the double popper valve head 44.

Preferably, the valve plates 22,24 are formed from silicon and the metering edges are formed by a technique such as that disclosed in commonly-owned, patent application Ser. No. 986,313, filed on Dec. 7, 1992, now U.S. Pat. No. 5,309,943, entitled *"Micro-Valve And Method Of Manufacture,"* the disclosure of which is incorporated herein by reference. Preferably, the metering orifice provided within each valve plate is rectangular.

As illustrated in FIG. 2, biasing means 54 include a top spring 62 extending between the free end of the top plate and the double popper valve head, and a bottom spring 64 extending between the anchored end of the bottom valve plate and the double poppet valve head.

In operation, the bimorph 48 cooperates with the double poppet valve head 44 such that the latter is urged toward an open position when the bimorph is bent. In that configuration, the piezoelectric fluid control valve is opened and hydraulic fluid is allowed to flow toward the outlet port 18.

Figure 4:
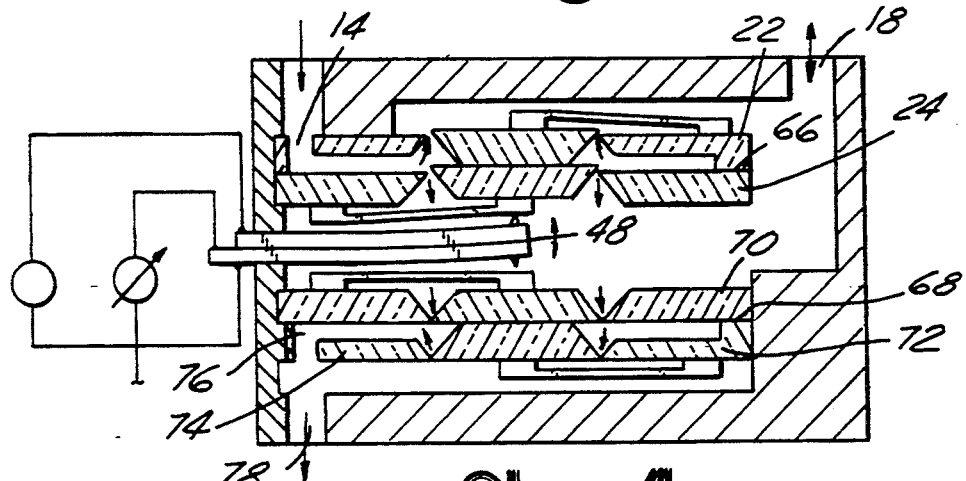
FIG. 4 is a cross-sectional view of an alternate embodiment of the present invention, illustrating the valve in an opened position.

A second alternative embodiment of the present invention is depicted in FIG. 4. In that embodiment, the top and bottom valve plates 22,24 define a first pair of valve plates 66. A second pair 68 of valve plates is disclosed in operative communication with the bimorph 48.

The second pair of valve plates 68 include a top valve plate 70 and a bottom valve plate 72. The latter plate has an anchored end 74 that is provided with an outlet channel 76 in communication with a return port 78 defined within the valve body.

In the embodiment depicted in FIG. 4, the bimorph 48 is deflected upon applying a potential difference thereto, so that the bimorph may move continuously towards a top deflected position, wherein the double popper valve head associated with the top pair of valve plates is opened, while the double popper valve head associated with the bottom pair of valve plates remains closed. From that position, the deflection of the bimorph may revert to a normally closed position. FIG. 3 is a view of the valve illustrating the hydraulic path of FIG. 4.

When the bimorph is deflected downwardly, the double popper valve head associated with the second pair of valve plates 68 is urged toward an open position, away from its normally closed position against seating forces exerted by a spring associated with the bottom valve plate 72 of the second pair 68. At the same time, the double poppet valve head associated with the first pair 66 is in its seated, normally closed position, thereby occluding passage of the hydraulic fluid toward the outlet port 18. As a result, the hydraulic fluid pressure from the valve ($P_c$) is continuously modulated in a linear relation with the input signal.

In one example, proportional control of the regulated pressure ($P_c$) was demonstrated with a conventional solenoid valve. The fluid flow rate was measured at 2.6 cubic inches per second maximum and $P_c$ was about 1500 psi. The normal range of fluid flow was up to 0.52 cubic inches per second.

A third embodiment of the piezoelectric fluid control valve of the present invention is depicted schematically in FIGS. 5-8. FIG. 5 depicts the valve in an "apply38 or "build" position; FIG. 6 depicts the valve in a "dump" position; and FIG. 7 depicts the valve in a "closed" position.

In FIGS. 5-8, an upper metering element 100 may include a top valve plate 112 and a contiguous bottom valve plate 114. A lower metering element 116 also may include a top 118 and bottom 120 valve plate. In practice, valve plates 112, 114 may be an integral unit. A similar observation is also applicable to plates 118, 120.

Each metering element 100, 116 has an anchored end affixed to the walls of the chamber 16, as shown. The anchored end of the upper metering element 100 is provided with an inlet channel 122, as shown. An outlet channel 123 is defined within the lower metering element 116. A pair of metering orifices 124, 126 is provided within each metering element 100, 116, respectively, as shown. A cantilevered spring valve 128, 130 is positionable within the associated metering orifice 124, 126, respectively, as shown. Each cantilevered spring valve 128, 130 is continuously displaceable between an opened position (see FIG. 5 of the upper metering element 100), and a normally closed position (see, e.g., cantilevered spring valve 130 of the lowering metering element 116 depicted in FIG. 5). Each one of the cantilevered spring valves 128, 130 has sharp metering edges 131, 133 that cooperate with each other to provide the associated metering orifices 124, 126, the edges 131, 133 blocking fluid when the cantilevered spring valves 128, 130 are closed.

Positioned between the cantilevered spring valves 128, 130 is the polymorph 132 which is in operative communication with the upper 100 and lower 116 metering elements. When a potential difference is applied by a circuit such as that depicted in FIGS. 2 and 4, the polymorph 132 becomes deflected in proportion to the potential difference.

In FIG. 6, the polymorph 132 is depicted in a downwardly deflected position in response to a potential difference generated in an electrical circuit (not shown). In the valve configuration depicted in that figure, hydraulic flow is diverted to the return port 78.

FIG. 7 depicts the valve in its closed position, wherein the polymorph 132 is in a null or undeflected position. In that position, the metering orifices 124, 126 are closed, so that the inlet and outlet channels 122, 123 are occluded.

FIG. 8 illustrates that in the third embodiment, each cantilevered spring valve has three sides of a rectangle so that each cantilevered spring valve effectively acts as a single piece "flapper." In the third embodiment, the double popper valve and spring of the earlier disclosed embodiment are combined in a single "flap."

FIG. 9 graphically illustrates a relatively large deflection obtained by the polymorph 132 as a result of the application of various applied voltages. Experimentally, the curve of FIG. 9 was derived with an optical non-contacting sensor. Such experiments have shown that it is possible to displace the cantilevered spring valves under load up to about 100 times per second. In the absence of any load, the polymorph may be displaced as quickly as about 2000 times per second. Such performance characteristics represent a quantum improvement over an art in which solenoid actuators respond at rates which are about 50% slower.

Current steel valves that are high precision and hand made tend to perform within a 100 hertz bandwidth, with a solenoid actuator capable of operation at 850–900 hertz. The polymorph exhibits a 2000 hertz bandwidth.

The polymorph to which the previous experimental procedure was subjected measured 18×9×1 mm, of which about 3.5 mm were rigidly mounted.

In light of the previous disclosure, it will be apparent that if a pressure transducer is in operative communication with the valve of the present invention, a pressure control valve would result.

Figure 10:
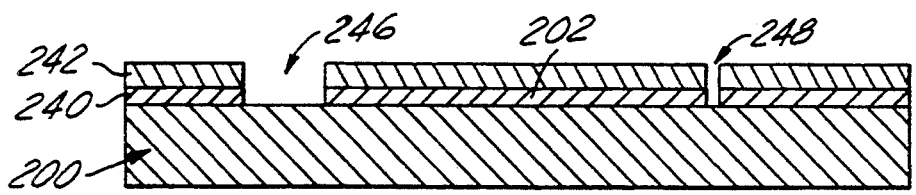
Figure 11:
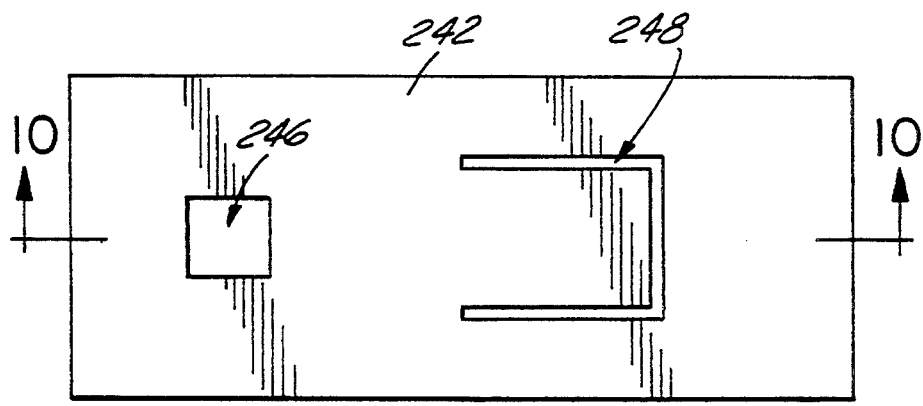

It is first noted that the valve plates 112, 114, 116, 118 are substantially the same. Thus, referring now to FIGS. 10-15, the method for forming an exemplary one of the valve plates 112, 114, 116, 118, here plate 112 will be described. Referring first to FIGS. 10 and 11, a semiconductor body 200, here lightly doped silicon having a concentration of $10^{16}/cm^3$ and a surface 202 parallel to the $<100>$ crystallographic plane, is provided. The upper and lower surfaces are polished. A more heavily doped layer 240, here 10 microns thick, is formed over the surface 202 by diffusing or implanting a P+ type dopant (here boron) into the surface 202, or by epitaxially growing such boron doped layer 240 on the surface 202. Here, the concentration of the boron dopant is $7\times 10^{19}/cm^3$ in layer 240. The thickness of the silicon body 200 is here 340 microns.

Next, a layer of silicon dioxide 242 is chemically vapor deposited on the upper surface of the doped layer 240, as shown in FIG. 10. It should be noted that the thickness of layer 242 is here 2 micrometers. Windows 246, 248 are reactive ion etched with vertical sidewalls into silicon dioxide layer 242 and into the doped layer 240, as shown, using conventional photolithographic etching processes. It is first noted that window 248 is formed to have three sides of a rectangle which correspond to the orifice 124 (FIG. 8) and window 246, here square, corresponds to supply port 14 (FIG. 8). In a typical embodiment the length and width of the rectangle are here 10 mm by 10 mm. It is next noted that the window 248 here has a width in the order of 1 micrometer and the window 246 has a width substantially larger, here several millimeters. Next, the silicon dioxide layer 242 is removed using a buffered hydrofluoric acid solution.

Figure 12:
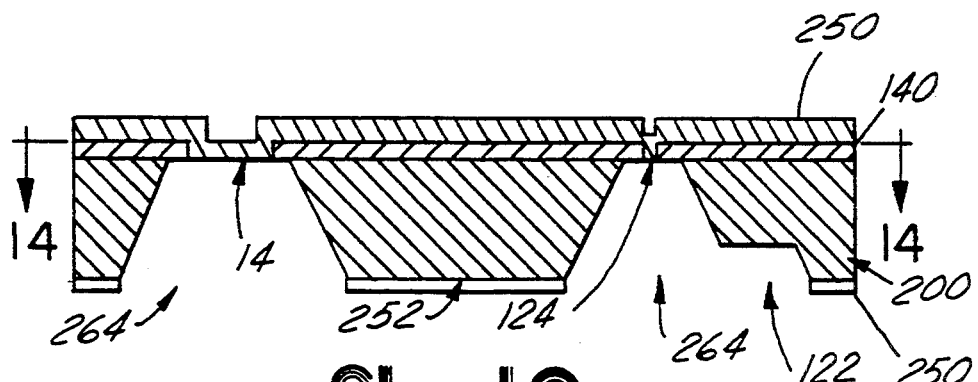

Next, layer $250_T$, and $250_B$ of silicon nitride are chemically vapor deposited over the upper surface of the doped layer 240 and the bottom surface 252 of the silicon body 200, respectively. Here, thickness of the silicon nitride layers $250_T$, $250_B$, is 0.1 micrometers, as shown in FIG. 12. A layer of photoresist, not shown is deposited over the bottom silicon nitride layer $250_B$. A mask 254, shown in cross hatch in FIG. 13, having an aperture 256 formed therein is imaged onto the photoresist layer, not shown, in a conventional manner. It is first noted that region 258 of aperture 256 is used to form the lower portion of supply port 14 (FIG. 8). Regions 260 are used to form inlet channels 122 (FIGS. 5 and 8). The portion 262 of the aperture 256 is used to form the region below the metering orifice 124 (FIGS. 5-8). The exposed portions of the silicon nitride layer $250_B$ exposed by aperture 256 are removed using a conventional reactive ion etching process to form a window 264 therein corresponding to aperture 256.

Next, the photoresist layer, not shown, is removed or stripped in a conventional manner. Referring now to FIGS. 12, 14, and 15, the bottom portions of the silicon body 200 exposed by the window 264 now formed in the silicon nitride layer $250_B$ are removed using a preferential or anisotropic etchant, here a solution of potassium hydroxide and isopropyl alcohol. More particularly the structure is submerged in a bath of such solution. It is noted that because of the crystallographic axis orientation of the silicon body 200, there is substantially no undercutting of the portions of the silicon body 200 disposed under the silicon nitride layer $250_B$. The etchant proceeds at an acute angle, here 54.7°. It is further noted, however, that because of the fact that there will be some undercutting around the corners of the masking windows, mask compensation, not shown, may be used at the corners 266 of the mask 254 (FIG. 13) to account for such undercutting.

The silicon nitride layer $250_T$ is used to protect the upper portion of the metering orifice 124 (FIGS. 8, 12, 14, and 15) from erosion by the solution of potassium hydroxide and isopropyl alcohol. The doped silicon layer 240 prevents erosion of the bottom surface of the metering orifice 124 by the solution of potassium hydroxide and isopropyl alcohol because such layer 240 etches at a much lower rate than silicon body 200. It is also noted that the region 262 (FIG. 13) of the mask 254 is wider than the width of region 260. Thus, the depth of etching into the bottom surface of the silicon body 200 is greater under region 262 (i.e., under the metering orifice 124 and port 14 (FIG. 12)) than under region 260 (i.e., the channels 122 (FIGS. 8, 12, 14, 15)). Next, the silicon nitride layers $250_T$, $250_B$ are removed using phosphoric acid to produce the valve plate 112 as shown in FIG. 16. It is noted that edges of doped silicon layer 240 forming orifice 124 do not contact each other. However, the orifice 124 is less than, or equal to, 1 micron and thus provide sufficient fluid blockage because of the viscosity and surface tension of the fluid.

Thus, valve plate 112 includes a semiconductor body, here silicon body 200, including doped layer 240, having formed integrally therein a cantilevered member, here cantilevered spring valve or flapper 128. The proximate end 231 of flapper 128 is integrally formed with the semiconductor body 200 and doped layer 240. Thus, an electro-mechanical actuator, here polymorph 132, deflects flapper 128 about axis 270. In particular, polymorph 132 deflects the distal end 272 of flapper 128 relative to the fixed, surrounding portions 281 of the supporting semiconductor body 200 and doped layer 240 in response to electrical signals fed to the polymorph 132 (FIG. 5).

Each one of the metering elements includes a pair of valve plates, such as plate 112, with their bottom surfaces bonded together, as shown in FIGS. 5-7. The polished mating surfaces of each plate are optically contacted and bonded together using conventional direct wafer bonding techniques.

Referring again to FIG. 7, it is first noted that the spring valve 128 is shown in the closed position. In such condition, the fluid in region 301 exerts equal and opposite forces on surfaces 300, 302, respectively. In addition, in the closed condition, fluid in regions 310, 320 exert forces on surfaces 304, 306 of the spring valve 128 which are also equal and opposite forces. It is noted that regions 310, 320 are within chamber 16 and thus are always at the same pressure. Thus, the valve 128 is statically pressure balanced by fluid in region 301 and regions 310, 320. In response to an electrical signal, the polymorph 132 deflects the spring valve 128 as shown in FIG. 5, for example. The force required by the polymorph 132 to deflect such valve 128 must be sufficient to overcome only the mechanical stiffness of the spring valve 128 because of the static pressure balance provided by the surrounding fluid in regions 301, 310 and 320. The stiffness of the valve 128 provides a restoring force against the dynamic fluid forces that may arise from fluid flowing through the opened valve. Likewise, to close the valve 128, the only force required is that which is necessary to overcome the dynamic fluid forces. Forces exerted at opposing edges help to create a counterbalancing effect which contributes to the high frequency response of the device.

Thus, there has been disclosed a piezoelectric fluid control valve which exhibits a higher frequency response than presently known. The valve provides a continuous modulation of fluid pressure in a linear relationship with the input signal communicated to the valve. Additionally, a preferred embodiment of the valve of the present invention can be fabricated at a relatively low cost in production quantities because it has only three moving parts: cantilevered spring valves 128, 130 and polymorph 132. Furthermore, a polymorph may be mounted to each surface of each valve 128 of elements 100, 116.

It is understood, therefore, that having described preferred embodiments of the invention, it will now be apparent to one of skill in the art that other embodiments incorporating its concept may be used. It is believed, therefore, that this invention should not be restricted to the disclosed embodiments, but rather should be limited only by the spirit and scope of the appended claims.

We claim:

1. A piezoelectric fluid control valve comprising:
    a valve body having
        a supply port for introducing fluid into the valve;
        a chamber defined within the valve body;
        an outlet port in communication with the chamber, the outlet port being capable of delivering the fluid to a controlled device which is operable in response thereto; and
        a relief port for returning the fluid to a source thereof;
    an upper metering element supported within the chamber,
    a lower metering element supported within the chamber;
        each metering element having
            an anchored end affixed to a wall of the chamber, the anchored end of the upper metering element and the anchored end of the lower metering element being provided respectively with an inlet and an outlet channel;
            a cantilevered spring valve which is positionable in relation to the associated metering element, each cantilevered spring valve and the associated metering element defining therebetween a pair of opposing metering orifices, each cantilevered spring valve having a pair of opposing sharp metering edges that cooperate with the associated metering element, each metering orifice in a pair thereof exerting forces which counterbalance each other, each cantilevered spring valve being continuously displaceable between an open position and a normally closed position, the metering edges blocking fluid when the cantilevered spring valve is in the closed position; and
    a polymorph positioned between and in operative communication with the cantilevered spring valves, the polymorph having a characteristic that as a potential difference is applied thereto as a function of a sensed condition, the polymorph deflects in proportion to the potential difference, thereby displacing an associated cantilevered spring valve, the fluid in the outlet port thereby being continuously modulated in response to the sensed condition.

2. The piezoelectric fluid control valve of claim 1 wherein the metering elements are formed from silicon.

3. The piezoelectric fluid control valve of claim 1 wherein each metering orifice is rectangular.

4. The piezoelectric fluid control valve of claim 1 wherein the polymorph includes at least one piezoelectric wafer bonded together such that deflection of the polymorph occurs upon the application of the potential difference across the at least one piezoelectric wafer.

5. The piezoelectric fluid control valve of claim 1 wherein the polymorph cooperates with the upper metering element such that the associated cantilevered spring valve is urged toward an open position when the polymorph is deflected upwardly, thereby opening the pair of metering orifices defined within the upper metering element and allowing fluid to flow toward the outlet port.

6. The piezoelectric fluid control valve of claim 1 wherein the polymorph cooperates with the lower metering element such that the associated lower cantilevered spring valve is urged toward an open position when the polymorph is deflected downwardly, thereby opening the pair of metering orifices defined within the lower metering element and allowing fluid to flow toward the relief port.

7. The piezoelectric fluid control valve of claim 1 wherein the sensed condition is brake pressure and the controlled device is an anti-lock brake system.

8. The piezoelectric fluid control valve of claim 1 wherein the electrical circuit comprises an analog drive circuit which includes an analog charge-drive circuit.

9. The piezoelectric fluid control valve of claim 1 wherein the polymorph is deflected upon applying a potential difference thereto so that the polymorph may move continuously between an upper deflected position wherein the cantilevered spring valve associated with the upper metering element is opened, while the cantilevered spring valve associated with the lower metering element is closed.

10. The piezoelectric fluid control valve of claim 1 wherein the polymorph is deflected so that the polymorph may move continuously between a lower deflected position wherein the cantilevered spring valve associated with the lower metering element is open, while the upper cantilevered spring valve associated with the upper metering element is closed.

11. The piezoelectric fluid control valve of claim 1 wherein the polymorph is neither deflected upwardly nor downwardly so that the cantilevered spring valves associated with the metering elements are closed so that only minimal fluid is communicated to the supply and outlet ports.

12. The piezoelectric fluid control valve of claim 1 wherein the polymorph includes two piezoelectric wafers.

13. The piezoelectric fluid control valve of claim 1 wherein the polymorph comprises a piezoelectric ceramic plate.

14. The piezoelectric fluid control valve of claim 1 wherein the polymorph comprises a series polymorph.

15. The piezoelectric fluid control valve of claim 1 wherein the polymorph comprises a parallel polymorph.

16. The piezoelectric fluid control valve of claim 1 wherein deflection of the polymorph varies in linear relationship with the input signal.

17. The piezoelectric fluid control valve of claim 16 wherein the polymorph includes at least one piezoelectric wafer bonded together such that deflection of the polymorph occurs in linear proportion to the potential difference across the at least one piezoelectric wafer.

18. The piezoelectric fluid control valve of claim 1, wherein the sensed condition is wheel dynamics and the controlled device is an anti-lock brake system.

19. The piezoelectric fluid control valve of claim 1, wherein the sensed condition is wheel dynamics and the controlled device is a traction control system.

20. The piezoelectric fluid control valve of claim 1, wherein the sensed condition is brake pressure and the controlled device is a traction control system.

* * * * *

UNITED STATES PATENT AND TRADEMARK OFFICE
CERTIFICATE OF CORRECTION

PATENT NO. : 5,445,185
DATED : August 29, 1995
INVENTOR(S) : Shunso F. Watanabe et al It is certified that error appears in the above-indentified patent and that said Letters Patent is hereby corrected as shown below:

On the title page: Item 73, the assignees should read as follows:

--Ford Motor Company, Dearborn, Michigan, and
Raytheon Company, Lexington, Massachusetts--.

Signed and Sealed this

Fifteenth Day of October, 1996

Attest:

BRUCE LEHMAN

Attesting Officer    Commissioner of Patents and Trademarks